(12) United States Patent
Ergler et al.

(10) Patent No.: US 10,598,798 B2
(45) Date of Patent: Mar. 24, 2020

(54) RADIATION DETECTOR WITH AN INTERMEDIATE LAYER

(71) Applicant: Siemens Healthcare GmbH, Erlangen (DE)

(72) Inventors: Thorsten Ergler, Erlangen (DE); Harald Geyer, Bubenreuth (DE); Michael Hosemann, Erlangen (DE); Stefan Wirth, Erlangen (DE); Jan Wrege, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 15/798,626

(22) Filed: Oct. 31, 2017

(65) Prior Publication Data

US 2018/0120447 A1   May 3, 2018

(30) Foreign Application Priority Data

Nov. 2, 2016   (DE) .................. 10 2016 221 481

(51) Int. Cl.
| G01T 1/115 | (2006.01) |
| G01T 1/24 | (2006.01) |
| G01T 1/36 | (2006.01) |
| G01T 1/20 | (2006.01) |

(52) U.S. Cl.
CPC ............ *G01T 1/115* (2013.01); *G01T 1/2002* (2013.01); *G01T 1/244* (2013.01); *G01T 1/247* (2013.01); *G01T 1/361* (2013.01)

(58) Field of Classification Search
CPC ....... G01T 1/115; G01T 1/2002; G01T 1/244; G01T 1/247; G01T 1/361

USPC .......................... 250/370.09, 370.01, 370.15
See application file for complete search history.

(56) References Cited

U.S. PATENT DOCUMENTS

| 5,379,336 A * | 1/1995 | Kramer ................ G01T 1/2928 |
| | | 250/370.09 |
| 6,452,186 B1 * | 9/2002 | Wieczorek ............ G01T 1/2002 |
| | | 250/214 VT |
| 7,339,176 B2 * | 3/2008 | El-Hanany ............ G01T 1/2928 |
| | | 250/370.09 |

(Continued)

FOREIGN PATENT DOCUMENTS

| DE | 102014213738 A1 | 1/2016 |
| WO | WO 2016046014 A1 | 3/2016 |

OTHER PUBLICATIONS

Office Action for German Patent Application No. 10 2016 221 481.0 dated Nov. 12, 2018.

(Continued)

*Primary Examiner* — David P Porta
*Assistant Examiner* — Blake C Riddick
(74) *Attorney, Agent, or Firm* — Harness, Dickey & Pierce, P.L.C.

(57) ABSTRACT

A radiation detector includes an intermediate layer, which is arranged between a detection layer with a number of detection elements and a number of readout units. In an example embodiment of this arrangement, the intermediate layer has a plurality of electrically-conductive connections between the detection elements and the readout units. An example embodiment further specifies a medical imaging system, as well as a method of using the heating apparatus.

15 Claims, 3 Drawing Sheets

(56) References Cited

U.S. PATENT DOCUMENTS

| | | | | |
|---|---|---|---|---|
| 2004/0113088 | A1* | 6/2004 | Brabec | G01T 1/2018 250/370.11 |
| 2005/0051731 | A1* | 3/2005 | Sato | H01L 27/14678 250/370.01 |
| 2008/0111083 | A1* | 5/2008 | Kondo | G01T 1/202 250/370.11 |
| 2008/0272320 | A1* | 11/2008 | Imai | G01T 1/24 250/580 |
| 2009/0290680 | A1* | 11/2009 | Tumer | G01T 1/247 378/62 |
| 2011/0155918 | A1* | 6/2011 | Bouhnik | G01T 1/249 250/370.14 |
| 2011/0211668 | A1* | 9/2011 | Steadman Booker | G01T 1/249 378/19 |
| 2011/0241031 | A1* | 10/2011 | von Malm | H01L 27/156 257/88 |
| 2011/0253901 | A1* | 10/2011 | Chmeissani Raad | G01T 1/249 250/370.09 |
| 2012/0133001 | A1 | 5/2012 | Tkaczyk et al. | |
| 2012/0211663 | A1 | 8/2012 | Kim et al. | |
| 2013/0083887 | A1* | 4/2013 | Li | A61B 6/032 378/19 |
| 2014/0138785 | A1* | 5/2014 | Pralle | H01L 27/14627 257/432 |
| 2014/0284489 | A1* | 9/2014 | Engel | G01T 1/241 250/370.09 |
| 2014/0348290 | A1* | 11/2014 | Harrison | G01N 23/046 378/19 |
| 2015/0060681 | A1* | 3/2015 | Chappo | H01L 27/14634 250/370.09 |
| 2016/0018536 | A1 | 1/2016 | Ergler et al. | |

OTHER PUBLICATIONS

Office Action for German Patent Application No. 10 2016 221 481.0 dated Nov. 12, 2018 and English translation thereof.

* cited by examiner

FIG 6

RADIATION DETECTOR WITH AN INTERMEDIATE LAYER

PRIORITY STATEMENT

The present application hereby claims priority under 35 U.S.C. § 119 to German patent application number DE 102016221481.0 filed Nov. 2, 2016, the entire contents of which are hereby incorporated herein by reference.

FIELD

At least one embodiment of the invention generally relates to a radiation detector, to a medical imaging system and/or to the use of a heating apparatus for heating a radiation detector.

BACKGROUND

In the development of radiation detectors—for example X-ray detectors for CT systems—an important consideration is to reduce manufacturing costs ever further. The main costs of a CT detector in such cases may be found in the sensor board. This usually contains the direct-converting or indirect-converting sensor material, the evaluation electronics (ASIC and in a few assemblies the photodiode as well) and a carrier material or carrier substrate, which may be needed as the base unit for the structure as a whole and gives the sensor board its mechanical stability.

The surface of ASIC in this case is usually equal to the surface of the overall CT detector. This is the case for example in the technology for integrating detectors, in which the photodiodes and the ASIC form one unit. The advantage of this approach lies in the fact that the line lengths between photodiode and evaluation electronics are kept as a short as possible in order to reduce electronic noise. Furthermore the technology has been developed to make smaller pixels in the detector possible.

With counting technology too the surface of the ASIC is usually equal to the surface of the overall CT detector. A large unknown in the development of the counting technology is in certain parts the influence of the input capacitance of a pixel on the response behavior and in such cases in particular the linearity and noise behavior in combination with the energy resolution of the ASIC. In order to take complexity and risk out of the development, the general aim has been to keep the input capacitances as low as possible and to keep them the same size. This may lead to a basic structure (see FIG. 1), in which the respective input channel of the ASIC is located directly on the sensor-side pad. The line lengths are minimized in such cases and where possible are designed so that the input capacitances are the same for all pixels.

The disadvantage of this highly-integrated approach on the other hand is the price. The ASIC costs are determined as a rule not by the functions contained, but by the surface. In particular with a view to larger sales markets, the aim should thus be to reduce the costs.

SUMMARY

At least one embodiment of the present invention specifies a lower-cost layout for a radiation detector.

At least one embodiment of the invention is directed to a radiation detector; at least one embodiment of the invention is directed to a medical imaging system; and at least one embodiment of the invention is directed to a use of a heating apparatus for heating a radiation detector.

The radiation detector of at least one embodiment comprises an intermediate layer, which is arranged between a detection layer with a number of detection elements and a number of readout units. In this case the intermediate layer has a plurality of electrically-conductive connections between the detection elements and the readout units.

The medical imaging system (e.g. CT), in at least one embodiment, comprises at least one embodiment of the radiation detector, preferably a direct-converting X-ray detector. The comparatively large surface of the detector in computed tomography results here for an inventive radiation detector in an especially large potential for savings in the manufacturing costs. In addition the effect of the heating apparatus comes into play especially effectively at the high radiation flux densities in CT devices and the high power losses associated therewith.

At least one embodiment of the invention is directed to a method to heat a radiation detector, the method comprising:

controlling a heating apparatus, including a heating element, arranged between a detection layer including a plurality of detection elements and a plurality of readout units, to regulate a heating power, introduceable into the radiation detector to heat the radiation detector.

At least one embodiment of the invention is directed to a method, comprising:

using a heating apparatus to heat a radiation detector, the heating apparatus including
 a heating element, arranged between a detection layer including a plurality of detection elements and a plurality of readout units, and
 a control device, to control the heating apparatus and to regulate a heating power, introduceable into the radiation detector to heat the radiation detector.

BRIEF DESCRIPTION OF THE DRAWINGS

The invention will be explained in detail once again below with reference to the enclosed figures on the basis of example embodiments. In this description, in the various figures, the same components are labeled with identical reference numbers. The figures are as a rule not true-to-scale. In the figures.

It should be pointed out in this context that the terms "top" and "bottom" here relate to the schematic diagram. In a radiation detector installed in accordance with specifications "top" corresponds to pointing in the direction of an (X-ray) radiation source and "bottom" accordingly pointing away from this direction (i.e. "top" corresponds to the direction from which the radiation to be detected strikes the detection elements).

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The radiation detector of at least one embodiment comprises an intermediate layer, which is arranged between a detection layer with a number of detection elements and a number of readout units. In this case the intermediate layer has a plurality of electrically-conductive connections between the detection elements and the readout units.

The radiation detector, in at least one embodiment, is a layer arrangement of layers preferably arranged essentially in parallel. In this case "essentially" means that the layers can also be slightly curved. By contrast with the prior art, in accordance with at least one embodiment of the invention, an intermediate layer is thus arranged between the detection layer and the readout units. The readout units are explicitly not connected directly to the detection layer, but are connected indirectly via the intermediate layer.

The intermediate layer, in at least one embodiment, has two opposing planar sides, wherein the detection layer is arranged adjacent to one planar side, which will be referred to below as the upper side. The readout units are arranged adjacent to the opposing planar side, which will also be referred to below as the lower side. The intermediate layer can in this case basically be designed as a continuous layer over the entire detector, which has an especially advantageous effect of the stability or rigidity. It can however also be formed from a number of intermediate layer elements arranged within the intermediate layer, which makes manufacturing easier.

The detection layer, in at least one embodiment, is generally embodied so that, by means of the detection elements, it converts the incident radiation into a usually analog electrical signal. Depending on the purpose for which it is used, the radiation detector can serve to measure electromagnetic radiation of different wavelengths and/or to measure particle radiation. To do this the detection layer comprises detection elements corresponding to the relevant detector type.

For example in indirect-converting X-ray detectors (also called integrating detectors), initially, following on from the upper side of the intermediate layer, a plurality of photodiodes is arranged as detection elements in a first sublayer of the detection layer, which is arranged in parallel to the intermediate layer. This is followed in its turn by a second sublayer of the detection layer in parallel thereto with a scintillator as a further detection element. This converts incident X-ray radiation into light in the visible wavelength. The scintillator of the second sublayer can extend continuously over wide areas of the detector, however it is preferably embodied in a modular design as a number of scintillator elements. The visible light created by the scintillator will subsequently be transmitted to the respective spatially assigned photodiode, which for its part converts it into an electrical signal.

With direct-converting detectors (also called photon-counting detectors) the incident radiation will be converted directly into an electrical signal for example, preferably in a semiconductor material. Detectors of this type therefore preferably comprise as their detection elements sensor elements made of Si (silicon), GaAs (gallium arsenide), HgI2 (mercury iodide) and/or a-Se (amorphous selenium), especially preferably made of CdTe (cadmium telluride) and/or CdZnTe (cadmium zinc telluride).

In both types, the detector comprises, in at least one embodiment, a plurality of pixels in each case, i.e. the smallest surface areas within the detection layer that can be read out independently. In order for it to be read out, each pixel is connected to a readout unit. In this case a number of pixels are preferably connected to one readout unit. These connections too are realized by way of the intermediate layer. The intermediate layer is conductively connected in this case preferably via a plurality of solder or adhesive connections on one side to the pixels of the detection layer. On the other side it is connected by way of just such connections to the readout units. The surface of the detection layer preferably corresponds to the surface of the intermediate layer, so that all pixels of the detection layer are each connected to a readout unit via the intermediate layer with the same overall surface and possibly of modular design.

The readout units generally serve to digitize electronic signals from the detection elements. They are preferably implemented as an ASIC (application specific integrated circuit). In such cases they preferably also comprise additional evaluation units. In the units for example, in direct-converting detectors, the electronic signals detected at the respective pixels are amplified as pulses, shaped and counted or suppressed, depending on pulse height and threshold value.

With different lengths of the lines—i.e. the connections from pixel to readout unit—different input capacitances will be created for the readout unit, as has already been explained above. However the input capacitances are preferably adapted to the readout units following them or to the evaluation units by so-called adaptation structures, so that it is possible work even with longer lines and even lines of different lengths. An adaptation structure is basically to be understood here as any possible adaptation of the capacitance. I.e. the adaptation structures change the capacitance for example on the basis of their geometrical layout such as form, diameter and/or length and/or a changed permittivity. In such cases however a balance is to be struck between the possibly greater line lengths and an increased electronic noise, which results in an inferior energy resolution. Consequently a compromise should be found between the energy resolution and the production costs in the design of the detector.

The intermediate layer (interposer), in at least one embodiment, thus overall represents a diverter layer or rewiring layer and also enhances the stability of the detector structure. It decouples the surfaces of the individual detection elements, i.e. also the overall surface of the detection layer, from the surfaces of the readout units. I.e. the readout units can preferably be designed smaller and no longer have to take up the entire detector surface. The intermediate layer thus may represent a paradigm shift in the development of radiation detectors; since in the current prior art the readout unit is arranged as directly as possible on the detection layer. By means of the reduction of the surface taken up by the readout units a price reduction in the manufacturing of an inventive radiation detector can thus also be achieved.

In at least one embodiment, the radiation detector has a heating apparatus. This comprises at least one heating element, which is arranged between a detection layer with a number of detection elements and a number of readout units. The at least one heating element is thus adjacent both to the readout units and also to the detection layer. In such cases it can be embodied so that it can emit an introduced heating power as homogeneously as possible over the entire surface of the detector. Especially preferably however a number of heating elements are distributed evenly and in particular areas over the surface of the detector so that individual areas of the radiation detector can be supplied with different heating power. This enables a temperature stabilization appropriate for the material of the detection elements or for the sensor material also to be achieved in different areas of the sensor material.

Furthermore the heating element can also be embodied so that, depending on requirements, it can introduce both a positive heating power and also a negative heating power into the detector. To this end for example it can act as a heating line, which is coupled to a Peltier element, which can both heat and also cool. In a simple manner the heating element can however also be embodied as a heating wire for example, of which the heating power is regulated by a current flowing through it.

The radiation detector illustrated here with the heating apparatus can be advantageously used as a self-contained idea independently of the previously described radiation detector, i.e. also without the intermediate layer with the conductive connections. Then the heating apparatus could be arranged for example in free spaces between the direct contacts between detection elements and readout units. Especially synergetic effects are produced however if the heating element of the heating apparatus is integrated into the intermediate layer of the previously described radiation detector. This is because it is precisely the intermediate layer that would otherwise make a heat transfer more difficult from heating elements usually arranged below the ASIC. At the same time the intermediate layer advantageously provides the space to arrange the heating element inventively in the detector.

The medical imaging system (e.g. CT), in at least one embodiment, comprises at least one embodiment of the radiation detector, preferably a direct-converting X-ray detector. The comparatively large surface of the detector in computed tomography results here for an inventive radiation detector in an especially large potential for savings in the manufacturing costs. In addition the effect of the heating apparatus comes into play especially effectively at the high radiation flux densities in CT devices and the high power losses associated therewith.

In particular with direct-converting X-ray detectors the resistance of the sensor material changes with the flux of X-ray radiation radiated in. This also leads at the same time to a change of the measured signal dependent on the X-ray flux, i.e. the counting rate and energy resolution. This signal change can be compensated for however, in that depending on the X-ray radiation variation, the heating power is also varied. Therefore, in accordance with at least one embodiment of the invention, a heating apparatus is used for heating a radiation detector. It is arranged in this case between a detection layer with a number of detection elements and a number of readout units. In addition a control device controls the heating apparatus and regulates a heating line introduced into the radiation detector.

Further especially advantageous embodiments and developments of the invention emerge from the dependent claims and also from the description given below, wherein the independent claims of one claim category can also be developed analogously to the dependent claims of another claim category and their description and in particular also individual features of different example embodiments or variants can be combined to form new example embodiments or variants.

In at least one embodiment of the inventive radiation detector, an overall surface of the detection elements is preferably large compared to an overall surface of the readout units. I.e. the sum of the individual surfaces of the detection elements is large compared to the sum of the individual surfaces of the readout units. Especially preferably the overall surface of the detection elements is twice as large, quite especially preferably four times as large as the overall surface of the readout units. This is because the more of the surface of the readout units that can be saved compared to the prior art, the greater is also the cost reduction.

Basically at least one embodiment of the inventive radiation detector can be used for detection of any given ionizing radiation, such as for example Alpha or Beta particles. Preferably however it is embodied for detection of X-ray radiation. X-ray radiation involves electromagnetic radiation with wavelength ranging from 1 to 250 picometers.

Preferably the electrically-conductive connections in an inventive radiation detector are embodied as vias and rewiring structures. Through these the individual pixels of the detection layer are connected to corresponding interfaces of the readout units. The intermediate layer is penetrated by the vias at right angles to the planar sides. The rewiring structures in this case refer to structures of conductor tracks that extend in a plane parallel to the planar sides of the intermediate layer. Thus a spatial re-arrangement of the conductive connections within this plane is achieved by means of the rewiring structures.

The intermediate layer in at least one embodiment of the inventive radiation detector, on a side facing towards the readout units, has a rewiring structure. I.e. the rewiring structure is preferably arranged on the lower side of the intermediate layer. Especially preferably the intermediate layer has the rewiring structure exclusively on the lower side.

For various reasons high demands may be placed on the substrate of which the intermediate layer consists. On the one hand for example in a CT device as carrier unit it should withstand the centrifugal forces (50 g-80 g depending on speed of rotation) in the detector and may not deform under such forces. The surface integrity, ripple, dimensions etc. may lie in a very narrow tolerance range, so that the alignment of the pixel matrix to the focus as a subunit in the detector is possible and there are no resulting image artifacts. This may be guaranteed by the manufacturing process itself. The further components (detection units, ASICs etc.) of the detector may be able to be placed highly-precisely. Here too there may be mandatory specifications on the manufacturing process side, e.g. on the ripple inter alia. Furthermore the reliability of the entire assembly should be guaranteed over 10 years. The assembly may be realized by multiple and complex soldering and gluing processes. The deviations of the different coefficients of thermal expansion of the individual subcomponents in such cases should be kept as low as possible, so that with thermal changes the induced stress remains low and the reliability and lifetime as high as possible.

The counting technology of the direct-converting detectors especially implies particular requirements on the rigidity of the substrate. When CdTe is used as the sensor material it is shown for example, that induced mechanical stresses influence the crystal structure and as a result the signal stability is no longer guaranteed. There then namely arise so-called high drift regions or drift spots, so that the detector may no longer be suitable for CT imaging. For the substrate this means that it may no longer deform after the attachment of the CdTe sensor and also may not exert any or only exert slight mechanical stresses on the sensor material in the event of thermal fluctuations.

Therefore, in at least one embodiment of an inventive radiation detector, the intermediate layer preferably has a substrate made of a glass fiber composite material, phenolic paper, ceramics and/or especially preferably glass. A glass fiber composite material in this case is to be understood as a combination material made of epoxy resin and glass fiber material. Ceramics refers to a material made of a plurality of anorganic non-metallic materials by molding and burning. Phenolic paper is fiber composite material made of paper and a synthetic resin, preferably phenoplast, which especially preferably is fire-retardant in accordance with class FR-4. For all of the materials the aforementioned requirements imposed on the substrate can be fulfilled in combination with at least one embodiment of the inventive layout, as will be described below in greater detail.

Glass is especially preferred as a substrate, because with this material the vias can be created via an etching process and do not have to be drilled mechanically. This leads to a more favorable aspect ratio, i.e. a better ratio of height to width of the vias produced. In other words, with glass, more vias per surface can be created, so that more free space is left between the vias (with the same density) for the rewiring structures and also if necessary for the heating elements.

The heating element is preferably embodied for at least one embodiment of an inventive radiation detector as a serpentine electrical conductor. It is thus arranged in the shape of a rectangle function alternating and preferably in turn on the upper side and the lower side of the intermediate layer. The heating element is thus quasi introduced as a hook-shaped heater into the intermediate layer by means of recesses etched on both sides for example. Especially preferably intermediate spaces are used for this, which are present between the conductive connections that connect the detection elements with the readout units. With the aid of the arrangement of the heating element in this way on both sides the introduced heating power can advantageously be emitted evenly to both adjacent sides, i.e. both to the detection elements and also to the readout units.

In at least one embodiment of an inventive radiation detector the heating apparatus preferably comprises a control device that regulates the heating power that is introduced into the radiation detector. The heating power can be adapted for example via a simple temperature measurement and a corresponding regulation circuit and/or as a function of a radiation power detected by the detector.

At least one embodiment of an inventive radiation detector preferably also comprises a number of conductive support structures, which serve on the one hand to forward the data from the readout units or evaluation units, which thus for example transmit the data in conjunction with other components to a reconstruction unit. On the other hand the support structures can also function however as a carrier element between the intermediate layer and for example a carrier layer lying below it. To this end the conductive support structures are arranged in a layer with the readout units or evaluation units. A conductive support structure especially preferably comprises a number of elements for forwarding the data of the readout unit, which can basically be embodied in a different manner, e.g. as a so-called ball stack structure. This refers to a stacked arrangement of solder balls and circuit boards with rewiring structures.

Such a conductive support structure makes it possible for the rewiring structures of the inventive intermediate layer to be kept simple, i.e. especially single-layer, by comparison with known multi-layer rewiring structures. By this means the stability of the intermediate layer is advantageously increased and the manufacturing process simplified.

Figure 1:
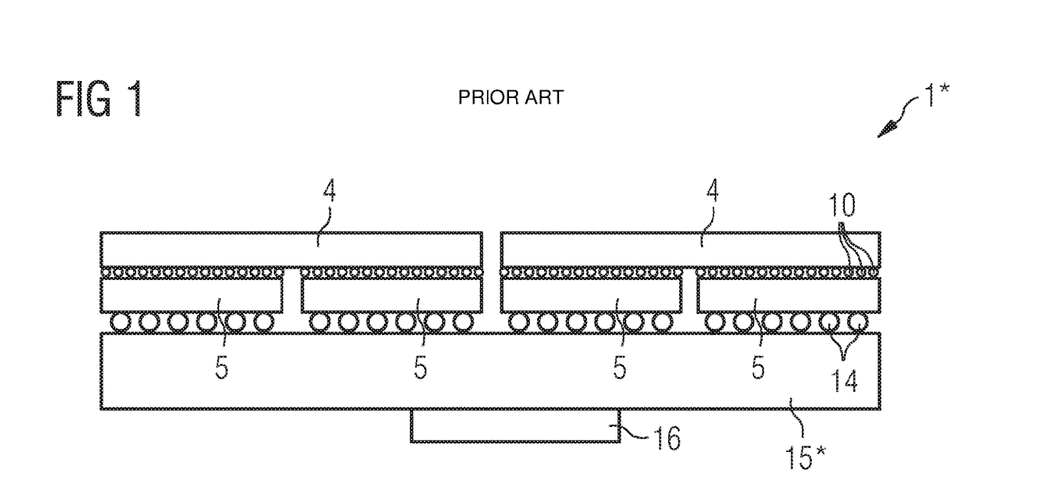
FIG. 1 shows a schematic sectional diagram of a prior-art radiation detector.

FIG. 1 shows an example of a schematic sectional diagram of a direct-converting radiation detector 1* according to the prior art. The radiation detector 1* is composed of a number of parallel layers here.

A first layer is formed by two semiconductor sensors 4 arranged next to one another, for example CdTe sensors. In a second layer lying below this layer ASICs 5 are arranged next to one another. The ASICs 5 of the second layer are connected directly via solder connections 10 to the semiconductor sensors 4. In this case they extend over an overall surface that is exactly the same size as the overall surface of the semiconductor sensor 4. Arranged below the second layer as a third layer is a ceramic carrier layer 15\*. This is usually embodied as an LTCC layer 15\* (Low Temperature Co-fired Ceramics). I.e. it is a multi-layer circuit based on sintered ceramic carriers. The ASICs 5 are in direct conductive contact with the carrier layer 15\* here via solder connections 14, wherein there is rewiring within the circuit of the LTCC layer 15\*. Via the carrier layer 15\* the radiation detector 1\* is connected by means of a connector 16, which acts as input or output interface of the radiation detector 1\*, for example with further evaluation units (not shown here) such as for example a reconstruction device of a CT device.

Incident radiation to be detected during operation is thus converted here by the semiconductor sensors 4 into an analog electrical signal, then read out directly by the ASICs 5, evaluated and digitized. Subsequently it is forwarded via the carrier layer 15\* and the connector 16.

Figure 2:
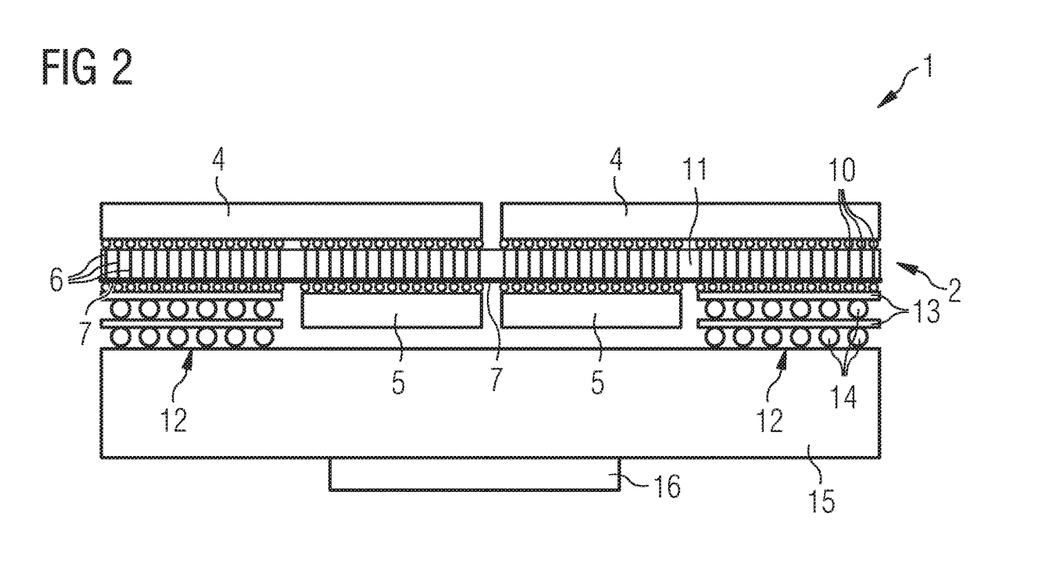
FIG. 2 shows a schematic sectional diagram of an example embodiment of an inventive radiation detector.

FIG. 2 shows a rough schematic diagram of an example embodiment of an inventive radiation detector 1 in the form of a direct-converting, photon-counting X-ray detector. By contrast with the prior art explained with reference to FIG. 1, the inventive radiation detector 1 comprises an intermediate layer 2. This is arranged below a detection layer 3 with two semiconductor sensors 4 as detection elements 4. The semiconductor sensors 4 comprise a plurality of pixels, which are connected via solder connections 10 to the intermediate layer 2.

The intermediate layer 2 has two planar sides, of which one, namely the upper side, points towards the detection layer 3. Vias 6 extend at right angles to the planar sides of the intermediate layer 2 in the intermediate layer 2, which are each connected via one of the solder connections 10 to a pixel of a semiconductor sensor 4. The vias 6 are preferably inserted by means of an etching process into a substrate 11 of the intermediate layer. Glass is preferably used as the substrate 11. The intermediate layer 2, on its planar side, namely a lower side, which lies opposite the upper side, has rewiring structures 7. The rewiring structures 7 in this case comprise conductor tracks, which are each connected by means of a via to a pixel of the semiconductor sensor 4. The radiation detector 1 further comprises two ASICs 5, which function as the readout unit 5. Each of the conductor tracks is connected via a contact to an input of an ASIC 5. Thus, by means of the rewiring structures 7, a spatial rearrangement is achieved in a plane in parallel to the planar sides of the intermediate layer 2. This enables the pixels that are distributed evenly over the relatively large surface of the semiconductor sensor 4 to be connected to the ASIC 5, which has a comparatively small surface.

The ASICs 5 are arranged in this case in a third layer below the intermediate layer 2. In this third layer so-called ball stack structures are arranged as conductive support structures 12 next to the ASICs 5. The ball stack structures 12 are a layered arrangement of parallel printed circuit boards 13 and solder balls 14 arranged between the boards, which connect the circuit boards 13 to one another. The circuit boards are at the same time arranged in parallel to the layers 2, 3 of the radiation detector 1. They can consist of prepreg for example and have rewiring structures embodied by means of usual methods. A significant portion of the rewiring necessary in the radiation detector 1 is done in these ball stack structures 12.

The ASICs 5 also have outputs, which are connected via the intermediate layer 2 to the ball stack structures 12. A carrier layer 15 is arranged below the third layer. The carrier layer 15 has conductor tracks, which are connected conductively via solder balls 14 to the ball stack structures. Compared to the prior art, the carrier layer 15 can be designed more simply and thereby at lower cost, since the rewiring, as already described, is largely done in the ball stack structures 12. The conductor tracks of the carrier layer 15 are routed jointly to one connector 16. Via this the inventive radiation detector can also be connected to further evaluation units (not shown here) such as for example an evaluation computer or a reconstruction device of a CT device.

The signal flow in the inventive radiation detector is as follows: Incident X-ray radiation is converted in the semiconductor sensors 4 into an analog electrical signal. The analog signal is forwarded via the solder connections 10 to the vias 6 in the intermediate layer 2. On the lower side of the intermediate layer 2 it is diverted spatially in the rewiring structure 7, i.e. the signal of a respective pixel is routed by means of a conductor track to the input of the ASIC 5 associated with it. In the ASIC 5 the signal is read out and evaluated, i.e. amplified as a pulse, shaped and counted or suppressed, depending on pulse height and threshold value. In the ASIC 5 the signal is also digitized. From the output of the ASIC 5 the digital signal in its turn is conveyed via the rewiring structure 7 of the intermediate layer 2 to a ball stack structure 12. In the ball stack structure the digital signals from the outputs of the ASICs 5 are rewired again as far as necessary, i.e. spatially diverted and finally conveyed via the carrier layer 15 to the connector 16 as output interface of the radiation detector.

Conversely the connector 16 can also act as the input interface for example for control signals of the radiation detector 1. These then take the analogous reverse path through the carrier layer 15, ball stack structure 12 and rewiring structure 7 to the control input of the ASIC. They can be used for example to define energy thresholds in the ASIC 5 for the X-ray quanta to be counted or to control the regulation of a heating apparatus (cf. FIG. 4).

Figure 3:
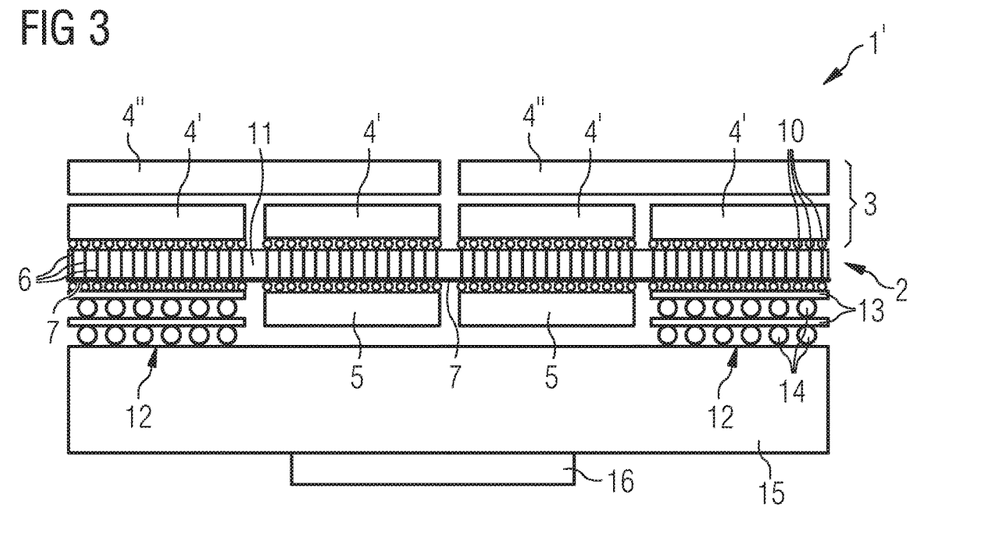
FIG. 3 shows a schematic sectional diagram of a further example embodiment of an inventive radiation detector.

FIG. 3 shows a similar radiation detector 1' to that shown in FIG. 2 by way of example and as a rough schematic diagram, but here however in the form of an integrating X-ray detector 1'. By contrast with FIG. 2, not just two semiconductor sensors 4, but also an arrangement with two lower layers are located here in the detection layer 3. A scintillator 4" is arranged as a detection element in the top lower layer, pointing outwards, which converts incident X-ray radiation into visible light. Four photodiodes 4' are arranged next to one another in the bottom lower layer arranged below this layer, to which the visible light from the scintillator 4" is transmitted. The photodiodes 4' extend together over the surface of the scintillator 4" and convert the visible light into an electrical signal assigned to the pixel, which is forwarded via a solder connection 10 to the intermediate layer 2. From the solder connections 10 onwards, the detector structure described here is the same as that described for FIG. 2, so that the reader is similarly referred to this point.

Figure 4:
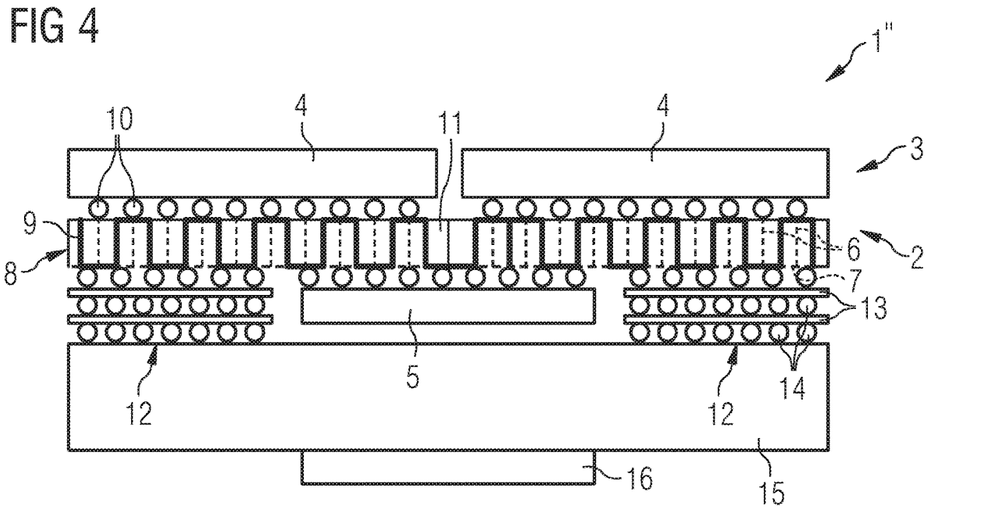
FIG. 4 shows a schematic sectional diagram of a further example embodiment of an inventive radiation detector with heating apparatus.

FIG. 4 likewise shows by way of example and as a rough schematic diagram an inventive radiation detector 1" similar to that shown in FIG. 2, but here with a heating apparatus 8. The heating apparatus 8 comprises a heating element 9. This is embodied as a heating wire 9, which is arranged between the vias 6 and the rewiring structures 7 in the intermediate layer 2. The heating wire 9 has the form of a rectangle function (serpentine) and extends alternately in sections in parallel to and on the upper side or the lower side of the intermediate layer 2, wherein the sections are each connected to one another with additional vias at right angles to the upper side or lower side. The radiation detector 1″ shown here—jointly for the two semiconductor sensors 4—has only one ASIC 5, which is arranged centrally and is connected in a similar way by means of the vias 6 and the rewiring structures 7 of the intermediate layer 2 to the individual pixels of both semiconductor sensors 4. A control device of the heating apparatus 8, which regulates the heating power, which is introduced into the radiation detector 1″ is additionally implemented here in the ASIC 5.

Figure 5:
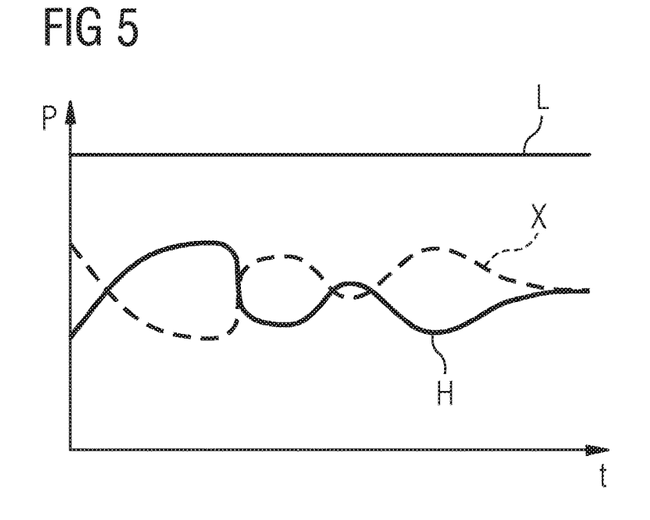
FIG. 5 shows a diagram of a graph for explaining the regulation of the heating apparatus and FIG. 6 shows a rough schematic diagram of an example embodiment of an inventive computed tomography system.

FIG. 5 shows a graph to explain the regulation of the heating apparatus. Powers occurring in the radiation detector 1″ from FIG. 4 are plotted on the vertical axis P in a timing curve against the horizontal axis t. A power loss X created by the X-ray radiation is shown as a dashed line, while an introduced heating power H of the heating apparatus 8 is shown as a dark line. The two functions have a similar opposing shape, so that a sum of the power losses L occurring in the detector remains constant. For this the heating power H introduced by the heating apparatus 8 will be regulated as a function of the incident X-ray intensity measured in the radiation detector 1″ by a control device implemented in the ASIC 5. The overall power loss L kept constant can already to taken into account in the design of the detector, so that artifacts can be avoided during imaging.

Figure 6:
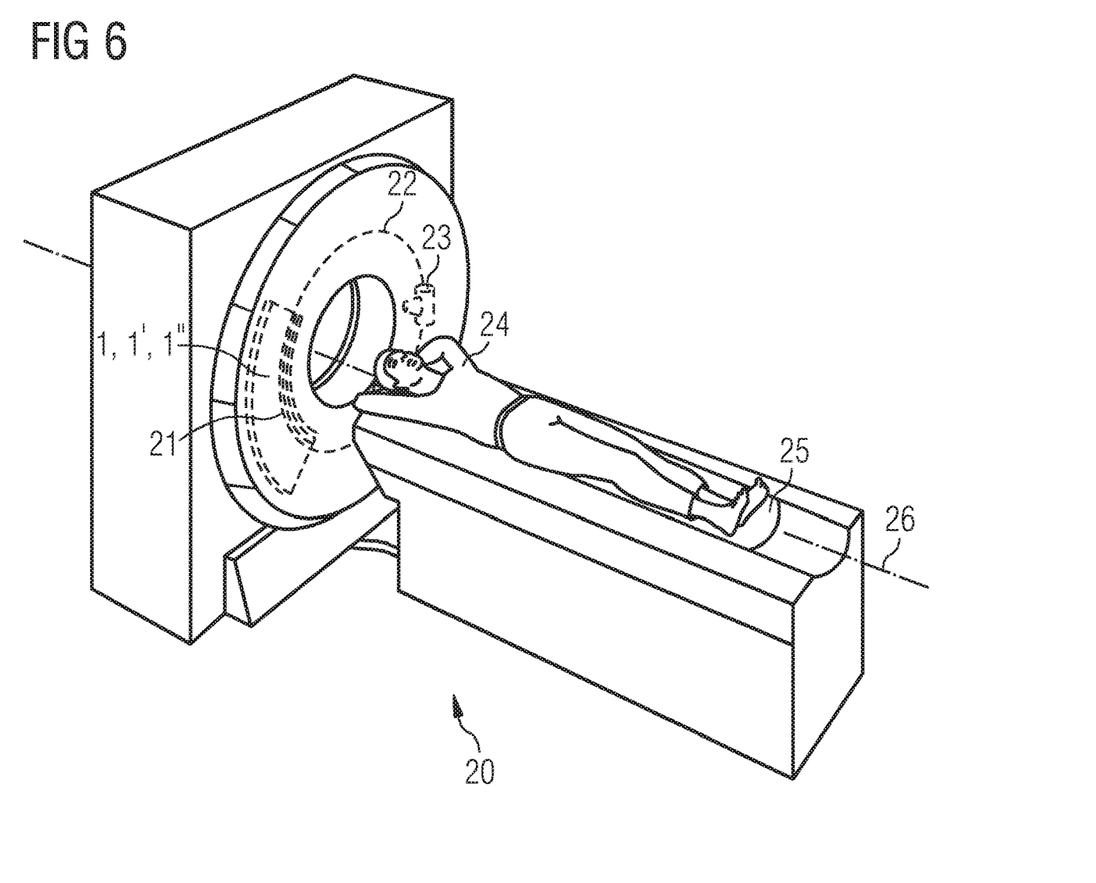

FIG. 6 shows, by way of example and as a rough schematic diagram, an inventive medical imaging system 20, here as a concrete example of a computed tomography device 20. The computed tomography device 20 comprises a patient table 25 for supporting a patient 24 as examination object. The patient table 25 is displaceable along a system axis 26 into the measuring field, via which the patient 24 can be positioned in the measurement field. The computed tomography device 20 further comprises a gantry 22 with a source radiation detector arrangement 23, 1, 1′, 1″ arranged rotatably about the system axis 26. The source radiation detector arrangement 23, 1, 1′, 1″ has an X-ray radiation source 23 and a radiation detector 1, 1′, 1″, which are aligned opposite one another so that, in operation, outgoing X-ray radiation from the focus of the X-ray radiation source 23 strikes the radiation detector 1, 1′, 1″. The radiation detector 1, 1′, 1″ is structured for spatially-resolved detection of the X-ray radiation into individual pixels 21, which are arranged into a number of radiation detector rows. For each projection the radiation detector 1, 1′, 1″ creates a set of projection data. This projection data is subsequently further processed and computed to form a resulting image.

It is known that such a computed tomography device 20 is used for 3D image reconstruction. To record an image of a region of interest, during rotation of the source radiation detector arrangement 23, 1, 1′, 1″, projection data is detected from a plurality of different projection directions. In the case of spiral scanning, during a rotation of the source radiation detector arrangement 23, 1, 1′, 1″ for example, there is a continuous displacement of the patient table 25 in the direction of the system axis 26. With this type of scanning, the X-ray radiation source 23 and the radiation detector 1, 1′, 1″ thus move on a helical path about the patient 24. The exact structure and the actual way in which such a CT operates are known to the person skilled in the art and will therefore not be explained in detail here.

In conclusion it is pointed out once again that the devices and methods described here in detail merely involve example embodiments, which can be modified by the person skilled in the art in a wide diversity of ways, without departing from the area of the invention. Furthermore the use of the indefinite article "a" or "an" does not exclude the features concerned also being present more than once.

Likewise the terms "facility", "unit" and "system" do not exclude the components concerned consisting of a number of interacting sub-components, which if necessary can also be spatially distributed. Thus the control device of the heating apparatus for example can be integrated in the readout unit or evaluation unit and/or be implemented in a central control device for the medical imaging system.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A radiation detector comprising:
   a detection layer including a plurality of detection elements, each detection element including a plurality of pixels;
   a plurality of readout units each pixel of the plurality of pixels being connected to one of the plurality of readout units and multiple pixels of the plurality of pixels are connected to one of the plurality of readout units;
   an intermediate layer, having two planar side surfaces, arranged between the detection layer and the plurality of readout units, the intermediate layer including a plurality of electrically-conductive connections each respectively arranged between respective ones of the plurality of detection elements and respective ones of the plurality of readout units, wherein the intermediate layer includes rewiring structures on one of the two the planar side surfaces and which faces towards the plurality of readout units, the rewiring structures including conductor tracks, which rewiring structures are each connected by a via to at least one pixel of at least one of the detection elements; and
   a support structure, laterally adjacent the plurality of readout units, including a number of elements for forwarding data from the plurality of readout units, wherein the support structure is a conductive support directly connected to the intermediate layer and a carrier layer.

2. The radiation detector of claim 1, wherein one side surface of each of the plurality of detection elements is a contact surface and one side surface of each of the plurality of readout units is a contact surface and an overall contact surface of the plurality of detection elements is relatively larger than a contact surface of the plurality of readout units.

3. The radiation detector of claim 2, wherein the radiation detector is embodied for detection of X-ray radiation.

4. The radiation detector of claim 2, wherein the plurality of electrically-conductive connections are embodied as vias and the rewiring structures.

5. A medical imaging system comprising the radiation detector of claim 2.

6. The radiation detector of claim 1, wherein the plurality of electrically-conductive connections are embodied as vias and the rewiring structures.

7. The radiation detector of claim 1, wherein the intermediate layer comprises a substrate made from at least one of a glass fiber composite material, phenolic paper, ceramics and glass.

8. The radiation detector of claim 1, further comprising a heating apparatus, including at least one heating element, arranged between the detection layer including the plurality of detection elements and the number of readout units.

9. The radiation detector of claim 8, wherein the heating element is embodied as a serpentine electrical conductor that extends along the two planar side surfaces of the intermediate layer.

10. The radiation detector of claim 9, wherein the heating apparatus comprises a control device, configured to regulate heating power introduced into the radiation detector.

11. The radiation detector of claim 8, wherein the heating apparatus comprises a control device, configured to regulate heating power introduced into the radiation detector.

12. A medical imaging system comprising the radiation detector of claim 8.

13. A medical imaging system comprising the radiation detector of claim 1.

14. The radiation detector of claim 1, wherein each of the conductor tracks is connected via a contact to an input of at least one readout unit such that pixels that are distributed evenly over a surface of the at least one detection element are connected to the at least one readout unit having a surface smaller than the surface of the at least one detection element.

15. The radiation detector of claim 1, wherein the plurality of detection elements are physically separated from one another by a gap and the plurality of readout units are physically separated from one another by a gap.

* * * * *